United States Patent
Aldana

(10) Patent No.: US 11,843,411 B2
(45) Date of Patent: Dec. 12, 2023

(54) SYSTEMS AND METHODS OF COEXISTENCE OF WI-FI COMMUNICATION AND NARROWBAND COMMUNICATION

(71) Applicant: Meta Platforms Technologies, LLC, Menlo Park, CA (US)

(72) Inventor: Carlos Horacio Aldana, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/560,535

(22) Filed: Dec. 23, 2021

(65) Prior Publication Data

US 2022/0247451 A1 Aug. 4, 2022

Related U.S. Application Data

(60) Provisional application No. 63/145,337, filed on Feb. 3, 2021.

(51) Int. Cl.
*H04B 1/71* (2011.01)
*H04B 1/7143* (2011.01)
(Continued)

(52) U.S. Cl.
CPC .......... *H04B 1/7143* (2013.01); *H04W 16/14* (2013.01); *H04W 72/0453* (2013.01); *H04B 2001/7154* (2013.01); *H04W 88/06* (2013.01)

(58) Field of Classification Search
CPC ........ H04B 1/7143; H04B 2001/7154; H04W 16/14; H04W 72/0453; H04W 88/06; H04W 72/1215
See application file for complete search history.

(56) References Cited

U.S. PATENT DOCUMENTS 6,377,608 B1 4/2002 Zyren
8,442,016 B1 5/2013 Lee et al.
(Continued)

FOREIGN PATENT DOCUMENTS

WO 2018202658 A1 11/2018

OTHER PUBLICATIONS

International Search Report and Written Opinion for International Application No. PCT/US2022/014708 dated May 30, 2022, 10 pages.

(Continued)

*Primary Examiner* — Dac V Ha
(74) *Attorney, Agent, or Firm* — Foley & Lardner LLP

(57) ABSTRACT

Disclosed herein are related to a co-existence of wireless communications over different protocols. In one aspect, two devices may communicate with each other through a wireless link. The two devices may communicate latency sensitive data (e.g., artificial reality data) through one or more frequency bands, according to a first wireless communication protocol. Meanwhile, another device in the vicinity may communicate or attempt to communicate through a portion of the one or more frequency bands, according to a second wireless communication protocol. In one aspect, a frequency band, transmission power, and/or duty cycle of transmission of the another device for communication over the second communication protocol and can set or controlled, to avoid interfering with the communication over the first communication protocol.

18 Claims, 8 Drawing Sheets

(51) Int. Cl.
*H04W 72/0453* (2023.01)
*H04W 16/14* (2009.01)
*H04W 88/06* (2009.01)
*H04B 1/715* (2011.01)

(56) References Cited

U.S. PATENT DOCUMENTS

| | | |
|---|---|---|
| 2010/0029204 A1 | 2/2010 | Gao et al. |
| 2015/0222410 A1* | 8/2015 | Belghoul ............ H04L 27/0006 370/252 |
| 2016/0309489 A1* | 10/2016 | Gan ........................ H04L 69/28 |
| 2018/0124777 A1* | 5/2018 | Yerramalli ........ H04W 72/0453 |
| 2021/0218450 A1* | 7/2021 | Liu .......................... H04L 5/005 |
| 2021/0235496 A1* | 7/2021 | Park ....................... H04B 1/715 |
| 2021/0266925 A1* | 8/2021 | Aly ....................... H04W 76/15 |

OTHER PUBLICATIONS

Mourad A., et al., "Bluetooth and IEEE 802.11n System Coexistence in the Automotive Domain," 2017 IEEE Wireless Communications and Networking Conference (WCNC), Mar. 19, 2017, 6 pages.

* cited by examiner

SYSTEMS AND METHODS OF COEXISTENCE OF WI-FI COMMUNICATION AND NARROWBAND COMMUNICATION

CROSS-REFERENCE TO RELATED APPLICATION

This application claims priority to U.S. Provisional Patent Application No. 63/145,337 filed on Feb. 3, 2021, which is incorporated by reference herein in its entirety.

FIELD OF DISCLOSURE

The present disclosure is generally related to communication for rendering artificial reality, including but not limited to coordinating/enabling channel access for Wi-Fi devices and narrowband devices.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method for wireless communication. In some embodiments, the method includes determining, by a wireless device, at least one frequency band within which to perform frequency hopping, the at least one frequency band comprising at least one of: an upper contiguous portion within a predetermined frequency range, or a plurality of frequency bands spaced apart from each other at a defined interval and each having a defined bandwidth. In some embodiments, the method includes performing, by the wireless device, frequency hopping within the at least one frequency band. The predetermined frequency range may be between 5,925 megahertz (MHz) to 6,425 MHz.

In some embodiments, a transmission output power of the frequency hopping by the wireless device is less than or equal to 10 dBm/MHz. In some embodiments, each frequency band of the plurality of frequency bands is smaller than the defined interval. In some embodiments, the defined interval is a channel bandwidth of communication through a first (wireless communication) protocol, and each frequency bandwidth of the plurality of frequency bands is a channel bandwidth of communication through a second (wireless communication) protocol. In some embodiments, the first protocol is a Wi-Fi communication protocol, and the second protocol is a Bluetooth communication protocol. In some embodiments, the at least one frequency band is defined according to the channel bandwidth of the communication through the first protocol.

In some embodiments, the method includes determining, by the wireless device, a number of available channels of the communication through the first protocol. In some embodiments, the method includes determining, by the wireless device, the at least one frequency band, according to the number of available channels. In some embodiments, the method includes setting, by the wireless device, a duty cycle of a transmission for the frequency hopping, according to a channel bandwidth of the first protocol. In some embodiments, the duty cycle of the transmission for the frequency hopping is proportional to the channel bandwidth of the first protocol.

In some embodiments, the method includes setting, by the wireless device, channel occupancy time (COT) to be equal to or less than a dwell time. In some embodiments, the COT is a time period for the wireless device to evaluate a channel for the frequency hopping, and the dwell time is a time period that the wireless device can stay in the same channel for frequency hopping. In some embodiments, the method includes setting, by the wireless device, an allowable transmission power for the frequency hopping, according to a bandwidth of the at least one frequency band.

Various embodiments disclosed herein are related to a wireless device. In some embodiments, the wireless device includes a wireless interface and one or more processors. In some embodiments, the one or more processors are configured to determine at least one frequency band within which to perform frequency hopping, the at least one frequency band comprising at least one of: an upper contiguous portion within a predetermined frequency range, or a plurality of frequency bands spaced apart from each other at a defined interval and each having a defined bandwidth. In some embodiments, the one or more processors are configured to cause the wireless interface to perform frequency hopping within the at least one frequency band. The predetermined frequency range may be between 5,925 megahertz (MHz) to 6,425 MHz.

In some embodiments, a transmission output power of the frequency hopping by the wireless device is less than or equal to 10 dBm/MHz. In some embodiments, each frequency band of the plurality of frequency bands is smaller than the defined interval. In some embodiments, the defined interval is a channel bandwidth of communication through a first protocol. In some embodiments, each frequency bandwidth of the plurality of frequency bands is a channel bandwidth of communication through a second protocol. In some embodiments, the first protocol is a Wi-Fi communication protocol. In some embodiments, the second protocol is a Bluetooth communication protocol. In some embodiments, the at least one frequency band is defined according to the channel bandwidth of the communication through the first protocol.

In some embodiments, the one or more processors are further configured to determine a number of available channels of the communication through the first protocol. In some embodiments, the one or more processors are further configured to determine the at least one frequency band, according to the number of available channels. In some embodiments, the one or more processors are further configured to set channel occupancy time (COT) to be equal to or less than a dwell time.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
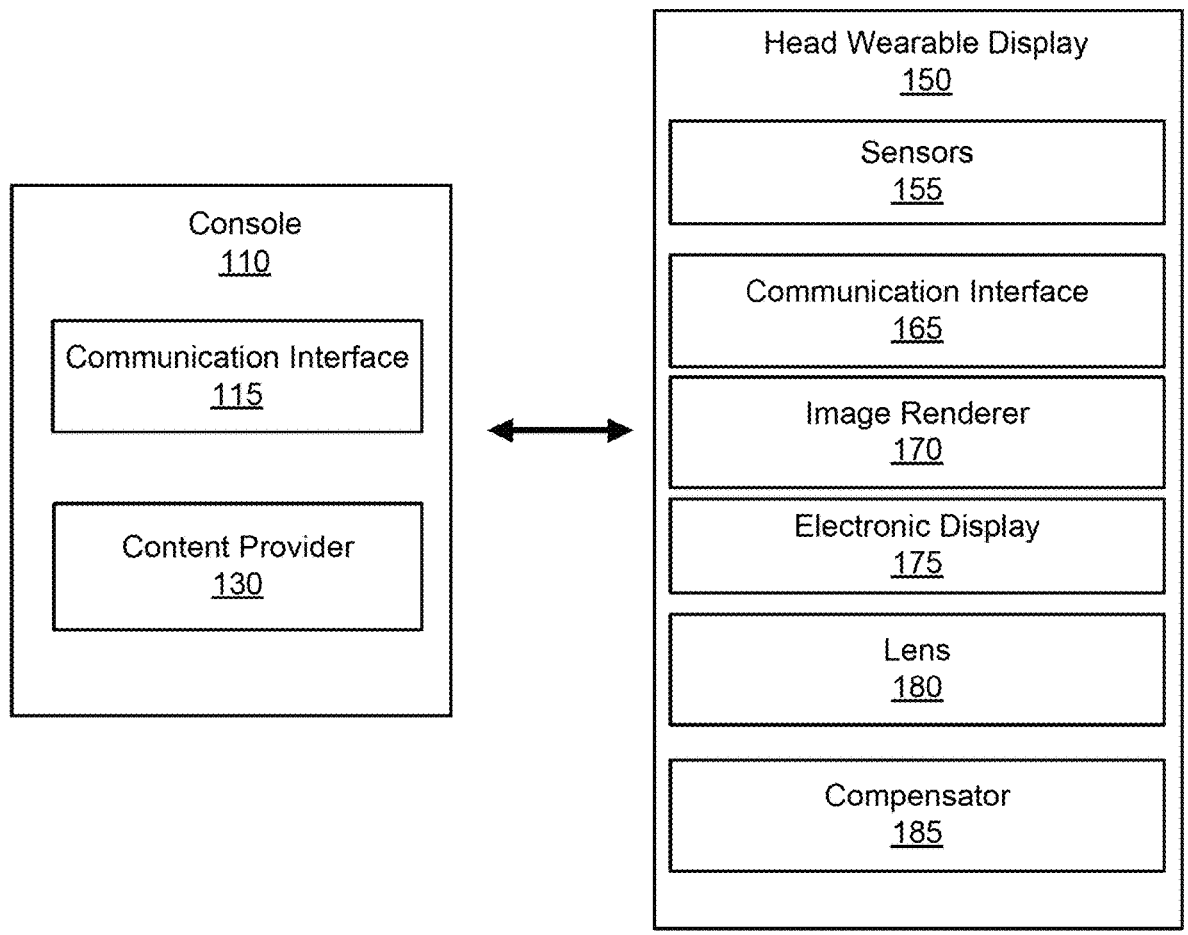
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems, methods and devices for co-existence of wireless communications over different protocols. In one aspect, two devices may communicate with each other through a wireless link. The two devices may communicate latency sensitive data (e.g., artificial reality data) through one or more frequency bands, according to a first wireless communication protocol. Meanwhile, another device in the vicinity (e.g., within 25 feet) may communicate or attempt to communicate through a portion of the one or more frequency bands, according to a second wireless communication protocol. The first wireless communication protocol may be a Wi-Fi communication protocol, where the second wireless communication protocol may be a narrow band (NB) communication protocol, such as Bluetooth communication protocol, etc. In one aspect, high power transmission by the another device according to (or using) the second communication protocol may interfere with the communication between the two devices according to (or using) the first communication protocol.

In one aspect, various approaches are implemented to reduce the interference due to a device communicating over the second communication protocol (e.g., NB communication protocol). In one approach, the device communicating over the second communication protocol (e.g., NB communication protocol) may perform frequency hopping within a subset of a set of frequency bands. The set of frequency bands may be in a range between 5,925 MHz and 6,425 MHz. The subset of the set of frequency bands can be predetermined, or adaptively determined depending on the channel condition. In one approach, the number of channel occupancy time (COT) attempts for the device can be set or limited to one within a dwell time. COT may be a time period for the wireless device to evaluate a channel for the frequency hopping, and dwell time may be a time period that the wireless device can stay in the same channel for frequency hopping. In one approach, an allowable transmission (TX) power of the device communicating over the second communication protocol (e.g., NB communication protocol) can be set or determined. The allowable TX power can be predetermined, or dynamically adjusted. For example, the allowable transmission (TX) power or allowable power spectral density (PSD) of the device may not exceed 10 dBm/MHz. The allowable TX power may change according to the bandwidth of communication over the second communication protocol (e.g., NB communication protocol). In one approach, a duty cycle of the device communicating over the second communication protocol (e.g., NB communication protocol) can be set or determined. The duty cycle may be set to a predetermined value, and/or set according to the TX power. In one approach, the device may transmit and/or receive a signal announcing a hopping pattern and/or an expected bandwidth, where the signal may be compatible with the communication over the first communication protocol, such that the hopping pattern, the expected bandwidth, and/or other information can be exchanged and negotiated with other devices operating according to the first communication protocol (e.g., Wi-Fi communication protocol).

Advantageously, through different approaches disclosed herein, the interference from another device communicating over the second communication protocol (e.g., NB communication protocol) can be reduced/avoided/prevented to protect the communication for the latency sensitive data over the first communication protocol (e.g., Wi-Fi communication protocol). Although some examples and descriptions herein are related to providing or protecting a remote rendering of artificial (e.g., virtual, augmented or mixed) reality, general principles disclosed herein can be applied to providing or protecting any latency sensitive communication.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 include eye trackers. The eye trackers may include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers. In some embodiments, a user of the HWD 150 is prompted to enable or disable the eye trackers.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, and/or the determined gaze direction of the user. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, and/or the determined gaze direction of the user. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
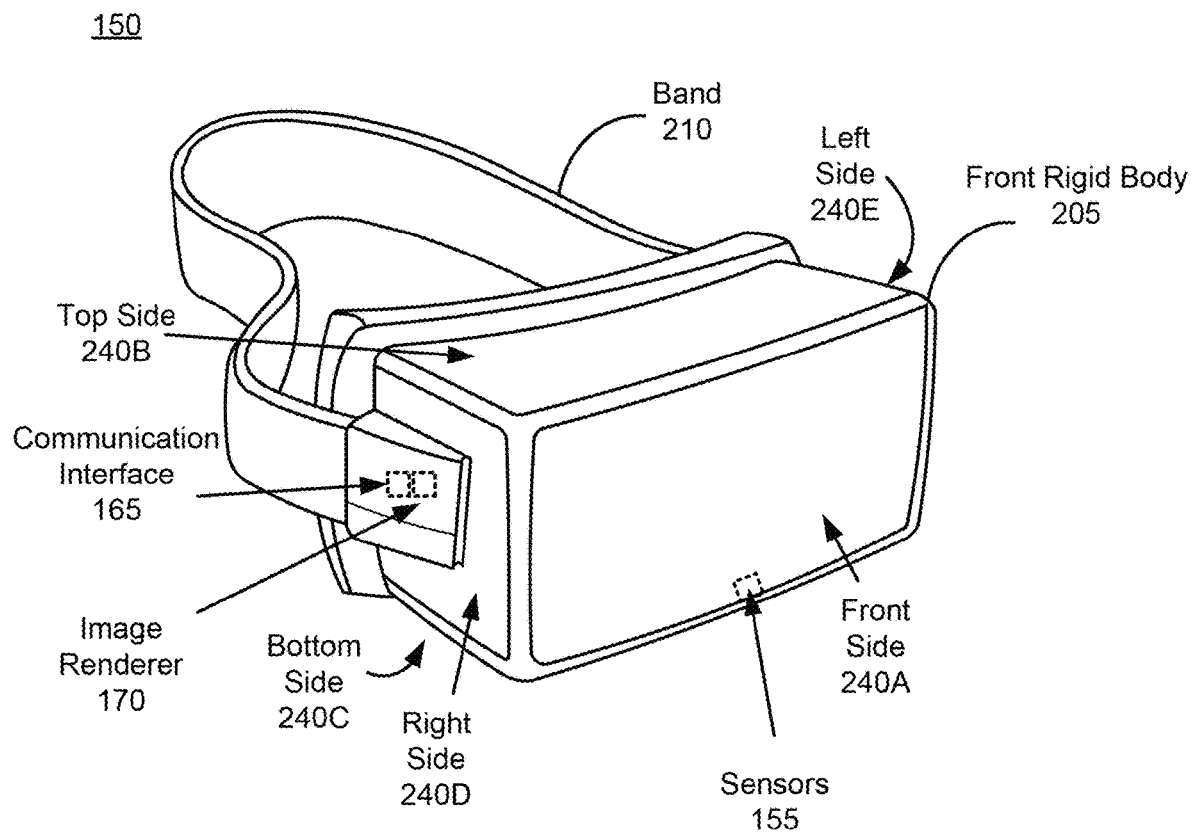
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the communication interface 165, and the image renderer 170. In the embodiment shown by FIG. 2, the communication interface 165, the image renderer 170, and the sensors 155 are located within the front rigid body 205, and may not be visible externally. In other embodiments, the HWD 150 has a different configuration than shown in FIG. 2. For example, the communication interface 165, the image renderer 170, and/or the sensors 155 may be in different locations than shown in FIG. 2.

Figure 3:
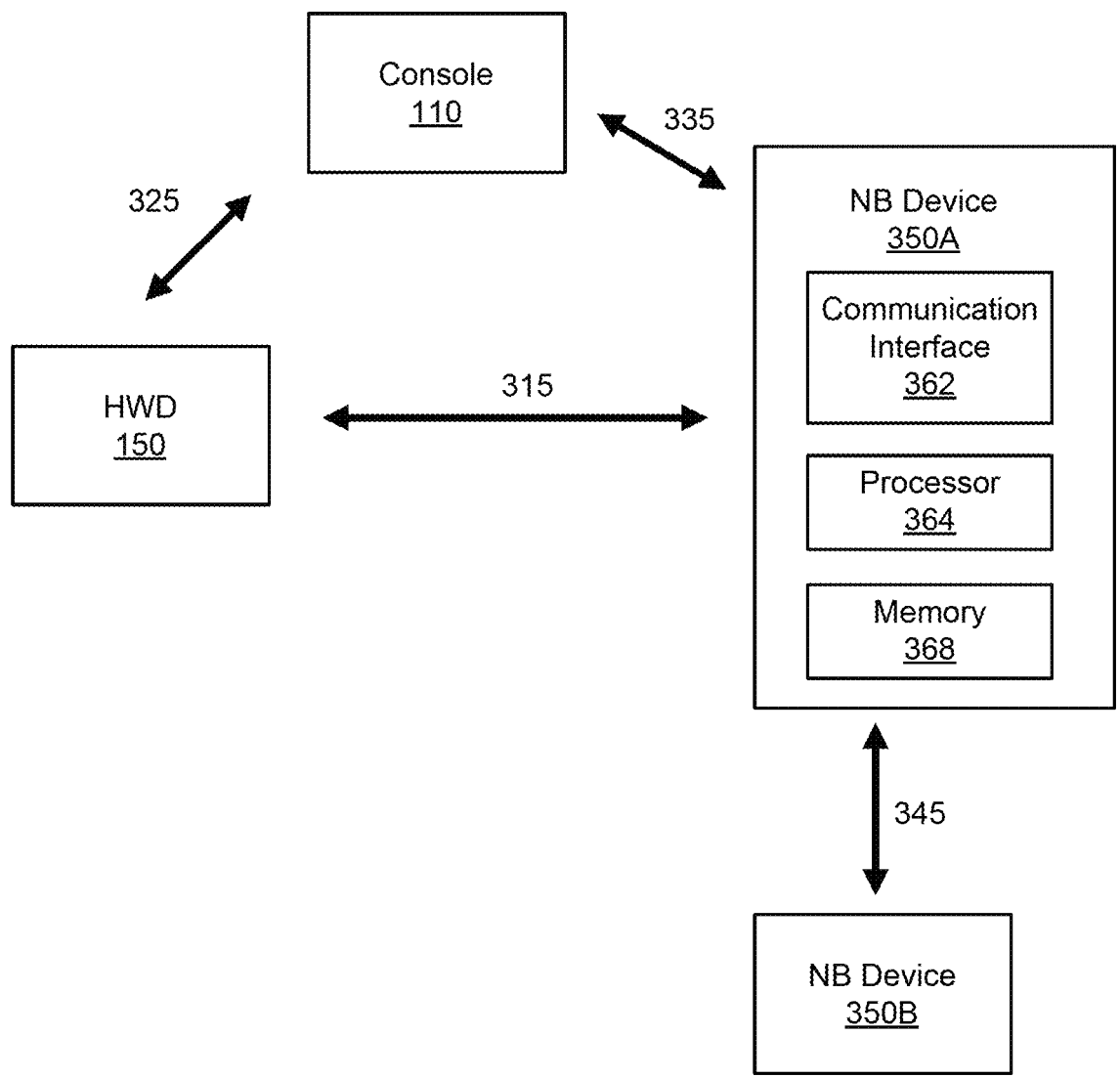
FIG. 3 is a diagram of a system environment including multiple wireless devices communicating over various protocols, according to an example implementation of the present disclosure.

FIG. 3 is a diagram of a system environment 300 including multiple wireless devices communicating over various protocols, according to an example implementation of the present disclosure. In one aspect, the console 110 and the HWD 150 can communicate with each other through a communication link 325, as described above with respect to FIG. 1. The communication link 325 may be a wireless communication link conforming to a first wireless communication protocol (e.g., Wi-Fi protocol). In one aspect, a NB device 350A may not be in communication with (but may cause interference to communications of) the HWD 150 and/or the console 110. In certain embodiments, the NB device 350A may communicate with the HWD 150 through a communication link 315, communicate with the console 110 through a communication link 335, and/or communicate with a NB device 350B through a communication link 345. Each of the communication links 315, 335, 345 may be a wireless communication link conforming to a second wireless communication protocol (e.g., NB communication protocol or Bluetooth communication protocol). In one aspect, the devices shown in FIG. 3 operate in a manner that communication performed according to different protocols can co-exist, despite close proximity (e.g., within 25 feet) among the devices. In some embodiments, the console 110 can operate as a soft access point.

In some embodiments, a NB device 350 is a wireless device. For example, the NB device 350 can be a laptop, a smart phone, a tablet PC, a wireless mouse, a wireless keyboard, a wireless speaker, a wireless headphone, a wireless earphone, a wireless headset, a wireless microphone, or any device communicating over a narrow band communication link (e.g., Bluetooth communication link). The NB device 350 may include a communication interface 362, a processor 364, and a memory 368. In some embodiments, the NB device 350 includes more, fewer, or different components than shown in FIG. 3. For example, the NB device 350 may include a display device to present a visual feedback to a user.

In some embodiments, the communication interface 362 includes an electronic component or a combination of an electronic component and a software component that communicates with another device according to a NB communication protocol (or a Bluetooth communication protocol). In some embodiments, the communication interface 362 includes a transmitter and a receiver, where configurations of the transmitter and the receiver can be set or adjusted, according to configuration information. The configuration information may be data indicating an allowable TX power, channel bandwidth for transmission, frequency band(s) allowed for communication, a hopping pattern, duty cycle, etc. The configuration information may be stored by the memory 368. The configuration information may be pre-set, or may be adjusted. In some embodiments, the communication interface 362 may configure the transmitter and/or the receiver for communication over the NB communication protocol, according to the configuration information.

In some embodiments, the processor 364 includes an electronic component or a combination of an electronic component and a software component that executes programs or instructions. The processor 364 may be embodied as a hardware, or a combination of hardware and software. The processor 364 may be an application specific integrated circuit (ASIC), a field programmable gate array (FPGA), or any logic computing device. In some embodiments, the memory 368 is any memory device that can store various instructions. The memory 368 may be a non-transitory storage medium. In one aspect, the processor 364 may store instructions when executed by the processor 364 cause the processor 364 or the communication interface 362 to execute various functions of the NB device 350 disclosed herein. In some embodiments, the processor 364 may retrieve configuration information of the communication interface 362 from the memory 368, and configure the communication interface 362 or cause the communication interface 362 to operate according to the configuration information for communication over the NB communication protocol. In some embodiments, the processor 364 may receive target or input configuration information, for example, through a user interface presented by the NB device 350A or from another device through the communication interface 362. In some embodiments, the processor 364 may negotiate with another device through the communication interface 362, for example, an allowable TX power, channel bandwidth for transmission, frequency bands allowed for communication, and/or duty cycle, and can determine configuration information according to the negotiation. The processor 364 may store the target configuration information or the updated configuration information using the memory 368.

In one approach, the processor 364 may cause the communication interface 362 to perform frequency hopping within a subset of a set of frequency bands to communicate, according to the NB communication protocol. The set of frequency bands may be in a range between 5,925 MHz and 6,425 MHz, for instance. The subset of the set of frequency bands can be predetermined, or dynamically adjusted according to the channel condition for instance. The subset of the set of frequency bands may include an upper (or lower, or other) contiguous portion of the set of frequency bands, or gaps between frequency channels of communication conforming to the Wi-Fi communication protocol. In one aspect, the processor 364 may select or determine a number of frequency bands in the subset of frequency bands, according to a number of available channels of communication over the Wi-Fi communication protocol. The processor 364 may monitor the frequency bands to determine the number of available channels of communication over the Wi-Fi communication protocol. Alternatively or additionally, the processor 364 may receive information indicating the number of available channels of communication over the Wi-Fi communication protocol from another device (e.g., console 110, HWD 150, or access point (AP)). In one aspect, the number of frequency bands for communication over the NB communication protocol may correspond to or may be proportional to the number of available channels of communication over the Wi-Fi communication protocol. For example, as the number of available channels of communication over the Wi-Fi communication protocol increases, the number of frequency bands for communication over the NB communication protocol may increase as well. Examples of a subset of frequency bands (e.g., portions marked with "x") for communication over the NB communication protocol are provided below with respect to FIG. 4.

In one approach, the processor 364 may set a duty cycle of communication over the second communication protocol (e.g., NB communication protocol). A duty cycle may be a relative duration of the transmitter being enabled within a time period (e.g., relative to a duration of the transmitter being disabled or non-transmitting). The processor 364 may determine or adjust the duty cycle of the communication, according to the TX power of the communication interface 362. The duty cycle may be set to a predetermined value, or set according to the TX power. In one approach, the processor 364 reduces the duty cycle in case the TX power and/or PSD of the communication interface 362 exceeds a predetermined threshold value (e.g., 10 dBm/MHz).

In one aspect, the duty cycle of very low power (VLP) NB transmissions on or over an assigned channel (e.g., lower 16 channels of contiguous 20 MHz channels) can be assigned a (pre)determined duty cycle or duty cycle threshold that is not to be exceeded (e.g., duty cycle not to exceed 6.67%). In some embodiments, the duty cycle of the VLP NB transmissions on any given 20 MHz channel can be selected to not exceed 0.417%. The VLP NB transmissions can be selected such that the NB transmissions do not occur on more than one NB channel at a time or at once. The NB channels can be selected to be non-overlapping. The duty cycle can vary and can be selected based at least in part on a channel bandwidth. Accordingly, effect on channels of Wi-Fi communication protocols due to the NB transmission can be significantly reduced as shown in table 1 below:

TABLE 1

Effect on Wi-Fi communication

| Wi-Fi BW (MHz) | Effect of example implementation |
|---|---|
| 20 | 0.417% affected (worst case) |
| 40 | 0.83% affected (worst case) |
| 80 | 1.67% affected (worst case) |
| 160 | 3.3% affected (worst case) |
| 320 | 6.67% affected (worst case) |

In some embodiments, the duty cycle can be controlled and/or monitored based in part on whether the devices are using adaptive or non-adaptive spectrum sharing. For example, adaptive NB spectrum sharing or techniques may be restricted or prevented as there is no duty cycle limits for adaptive NB. Non-adaptive NB spectrum sharing may be permitted with a maximum duty cycle of, for example but not limited to, 6.67% over the first 320 MHz contiguous channel bandwidth. In some embodiments, when there is an additional 320 MHz contiguous channel available, the same 6.67% limit can be applied to the additional 320 MHz contiguous channel bandwidth. In some embodiments, 10 dBm/MHz can be permitted or allowed for specific types of signals, such as but not limited to, short control signaling (SCS) signals (e.g., discovery reference signals (DRS) in 3GPP), and the remaining or all other transmissions can use 1 dBm/MHz.

In one approach, the processor 364 may set an allowable PSD and/or TX power of communication over the second communication protocol (e.g., NB communication protocol). The processor 364 may determine or adjust the allowable PSD or TX power, according to a number of frequency hops of communication over the second communication protocol (e.g., NB communication protocol). For example, the allowable PSD or TX power may increase as the number of frequency hops increases, until a threshold number of frequency hops is reached. Examples of changing the PSD or the TX power according to the number of frequency hops are provided below with respect to FIG. 5.

In one approach, the processor 364 may set or limit an allowable transmission (TX) power of the NB device 350 communicating over the second communication protocol (e.g., NB communication protocol). The allowable TX power can be predetermined, or set according to the bandwidth of communication over the second communication protocol (e.g., NB communication protocol). For example, the allowable TX power or allowable PSD of the NB device 350 may not exceed 10 dBm/MHz. The allowable TX power may be increased, until the bandwidth of communication over the second communication protocol (e.g., NB communication protocol) reaches a threshold value. After the bandwidth of communication over the second communication protocol (e.g., NB communication protocol) reaches the threshold value, the allowable TX power may be set to a predetermined value (e.g., 14 dBm). Examples of changing an allowable TX power according to the bandwidth of communication over the NB communication protocol are provided below with respect to FIG. 6.

In one approach, the processor 364 may set or limit the number of COTs. In some embodiments, very low power (VLP) NB transmissions can include transmission by a VLP device in less than 20 MHz channel bandwidth with a mean effective isotropic radiated power (e.i.r.p.) density higher than 1 dBm/MHz. A COT can be selected or limited to one VLP NB transmission. In some embodiments, the number of COT attempts for NB devices 350 can be set to or limited to 1 attempt within a (pre)determined dwell time. In some embodiments, the maximum COT size for NB devices can be reduced or set to a particular size/duration (e.g., 625 μsec). Accordingly, the NB device 350 may not occupy the channel or attempt to access the channel for an extended time period, such that communication over the Wi-Fi communication protocol can co-exist or be protected/supported.

In one approach, the processor 364 generates a signal announcing information (e.g., configuration information), and configures or causes the communication interface 362 to transmit the signal. In one aspect, the signal is understandable or decodable by other devices (e.g., the console 110 or the HWD 150) communicating over the Wi-Fi communication protocol. For example, the signal may be a (NB) beacon signal with a preamble to indicate a hopping pattern and/or an expected bandwidth (BW), where the preamble may have a similar/same structure as the one implemented for the Wi-Fi communication protocol. Other devices can use the information from the NB beacon signal to make an informed decision on how to restrict or assign the frequency hopping pattern of NB devices 350 to specific channels or channel gaps. In some embodiments, the NB device 350 can be instructed, commanded or requested to provide or transmit the signal (e.g., NB beacon signal with Wi-Fi preamble) to indicate or announce a hopping pattern, hopping pattern properties and/or an expected occupied bandwidth. The preamble can include a 802.11, 802.11ax, or 802.11be preamble which can be used or transmitted prior to a NB signal transmission.

Figure 4:
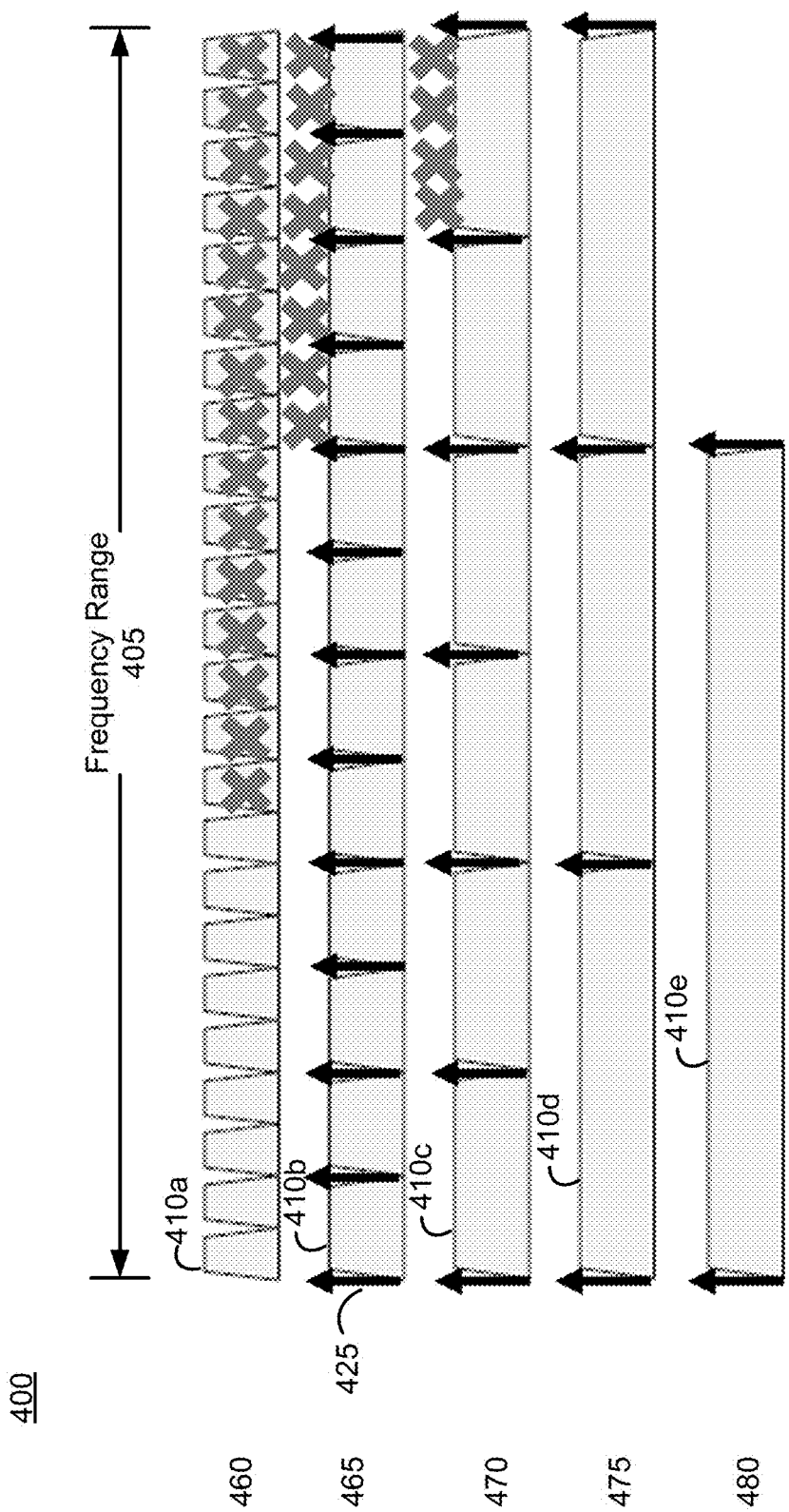
FIG. 4 is a diagram of example frequency bands allocated for a narrowband communication, according to an example implementation of the present disclosure.

Referring to FIG. 4, illustrated is a diagram 400 of example frequency bands allocated for a narrowband communication, according to an example implementation of the present disclosure. In one aspect, different devices (e.g., console 110, HWD 150, NB device 350, etc.) may share a portion of a frequency range 405, and can communicate over different protocols. The frequency range 405 may be between 5,925 MHz and 6,425 MHz.

The NB devices 350 can communicate over a NB communication protocol through a subset of a set of frequency bands in the frequency range 405, without interfering with the communication over the Wi-Fi communication protocol. In some embodiments, the NB devices 350 can be assigned or allocated a subset of the set of frequency bands for frequency hopping. The remaining subsets can be allocated or assigned for Wi-Fi communication. For example, the frequency range 405 can be partitioned or divided into a set of frequency bands 410. Each frequency band 410 may have a bandwidth corresponding to a channel width of a Wi-Fi communication. Some of the frequency bands 410 may be allocated or used as channels for the NB communication protocol, and the remaining/rest of the frequency bands 410 may be allocated or used as channels for the Wi-Fi communication protocol.

In one example, the number of frequency bands 410 allocated for the NB communication may change according to the bandwidth of the frequency band 410. For example, each frequency band 410 may have a 20 MHz, 40 MHz, 80 MHz, 160 MHz, or 320 MHz bandwidth, as shown in cases 460, 465, 470, 475, 480, respectively.

For example in the case 460, the frequency range 405 can be partitioned into 20 MHz frequency bands 410a, and 15 unique frequency bands 410a (e.g., 15 upper contiguous frequency bands 410a within the frequency range 405) can be assigned to NB devices 350 to perform frequency hopping according to NB communication protocol. Each of the remaining or lower frequency bands 410a within the frequency range 405 can be allocated or assigned as a corresponding channel for Wi-Fi communication.

For example in a case 465, the frequency range 405 can be partitioned into 40 MHz frequency bands 410b, and 4 unique 20 MHz frequency bands 410b (e.g., 8 higher frequency bands 410b within the frequency range 405) can be assigned to NB devices 350 to perform frequency hopping according to NB communication protocol. Each of the remaining or lower frequency bands 410b within the frequency range 405 can be allocated or assigned as a corresponding channel for Wi-Fi communication. The 4 upper frequency bands 410b can be allocated to or assigned as 8 unique 20 MHz channels, 16 unique 10 MHz channels, 32 unique 5 MHz channels, 64 unique 2.5 MHz channels, 80 unique 2 MHz channels, or 160 unique 1 MHz channels for NB communication.

For example in a case 470, the frequency range 405 can be partitioned into 80 MHz frequency bands 410c, and one unique 80 MHz frequency bands 410c (e.g., the highest frequency band 410c within the frequency range 405) can be assigned to NB devices 350 to perform frequency hopping according to NB communication protocol. Each of the remaining or lower frequency bands 410c within the frequency range 405 can be allocated or assigned as a corresponding channel for Wi-Fi communication. The upper frequency band 410c can be allocated to or assigned as 4 unique 20 MHz channels, 8 unique 10 MHz channels, or 16 unique 5 MHz channels, or 32 unique 2.5 MHz channels, or 40 unique 2 MHz channels, or 80 unique 1 MHz channels for NB communication.

In some embodiments, the frequency hopping patterns of NB devices can be assigned to or restricted to/within gaps between the respective channels. For example, in some embodiments, the frequency hopping patterns can be assigned to 1.875 MHz gaps 425, where a frequency band 410 can be located between two gaps 425. By assigning or allocating the gaps 425 (or portions thereof) to NB device 350 to communicate over the NB communication protocol, communication over the Wi-Fi communication protocol can be protected.

In one aspect, the NB device 350 can detect the channel condition of the Wi-Fi communication, and can automatically select or determine the frequency bands to perform frequency hopping for NB communication. In one aspect, the number of frequency bands assigned to or allocated for NB communication depends on the number of channels of the Wi-Fi communication protocol. For example, the Wi-Fi communication is guaranteed a threshold number of channels (e.g., 3 or 4). As the number of channels for the Wi-Fi communication increases, a larger number of frequency bands can be assigned or allocated to the NB communication. For example in a case 475, the frequency range 405 can be partitioned into three 160 MHz frequency bands 410d for the Wi-Fi communication. Similarly, for example in a case 480, the frequency range 405 is allocated or assigned to one 320 MHz frequency band 410e for the Wi-Fi communication. In the cases 475, 480, because the number of channels for the Wi-Fi communication is less than a threshold number (e.g., 4) of channels, the frequency bands 410d, 410e may not be assigned to the NB communication. As shown in the cases 460, 465, 470, the number of frequency bands 410 allocated or assigned to the NB communication may increase, as the number of channels for the Wi-Fi communication increases.

Figure 5:
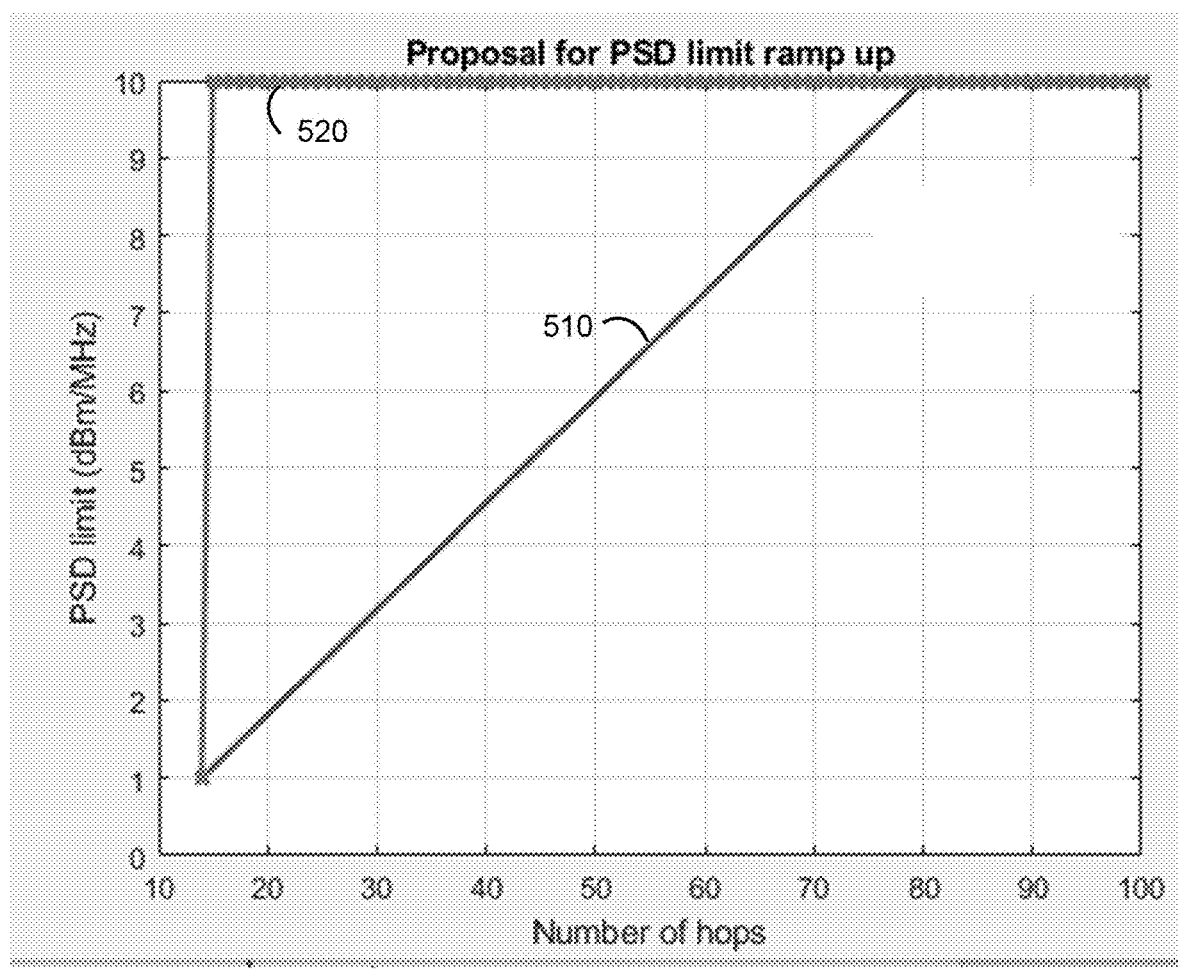
FIG. 5 is a diagram of an example allowable output power of a narrowband communication for a corresponding number of frequency hops, according to an example implementation of the present disclosure.

FIG. 5 is a diagram 500 of an example allowable TX power or PSD of NB communication for a corresponding number of frequency hops, according to an example implementation of the present disclosure. In one aspect, the processor 364 may store a function or a table representing a curve 510 by the memory 368, and can apply a target number of frequency hops of NB communication to the function or table to determine a corresponding TX power or PSD. In one example, as the target number of frequency hops increases, the TX power or PSD of NB communication may linearly increase, until the TX power or PSD reaches a threshold value (e.g., 10 dBm/MHz). The curve 510 can be represented by the following equation, for example:

$$\text{PSD limit}=\min(\tfrac{3}{22}*(\#\text{hops})-0.9091, 10)\text{dBm/MHz}.$$

In one aspect, a lower number of frequency hopping for the NB communication has a higher chance of interfering with the Wi-Fi communication. Compared to allowing the transmission at the threshold power or PSD (e.g., 10 dBm/MHz) for any number of frequency hops as shown in a curve 520, allowing a lower TX power or PSD for a lower target number of frequency hops of NB communication can help protect the communication over the Wi-Fi communication protocol.

Figure 6:
FIG. 6 is a diagram of an example allowable output power of a narrowband communication for a corresponding channel bandwidth, according to an example implementation of the present disclosure.

FIG. 6 is a diagram 600 of an example allowable output power of NB communication for a corresponding channel bandwidth, according to an example implementation of the present disclosure. In one aspect, the processor 364 may store a function or a table representing a curve 610 by the memory 368, and can apply a target bandwidth of NB communication to the function or table to determine a corresponding TX power. In one aspect, the curve 610 is set, such that the PSD (or TX power per bandwidth) is less than 10 dBm/MHz and the TX power is less than 14 dBm.

Controlling or limiting the TX power of the NB device 350 can help protect the communication over the Wi-Fi communication protocol.

Figure 7:
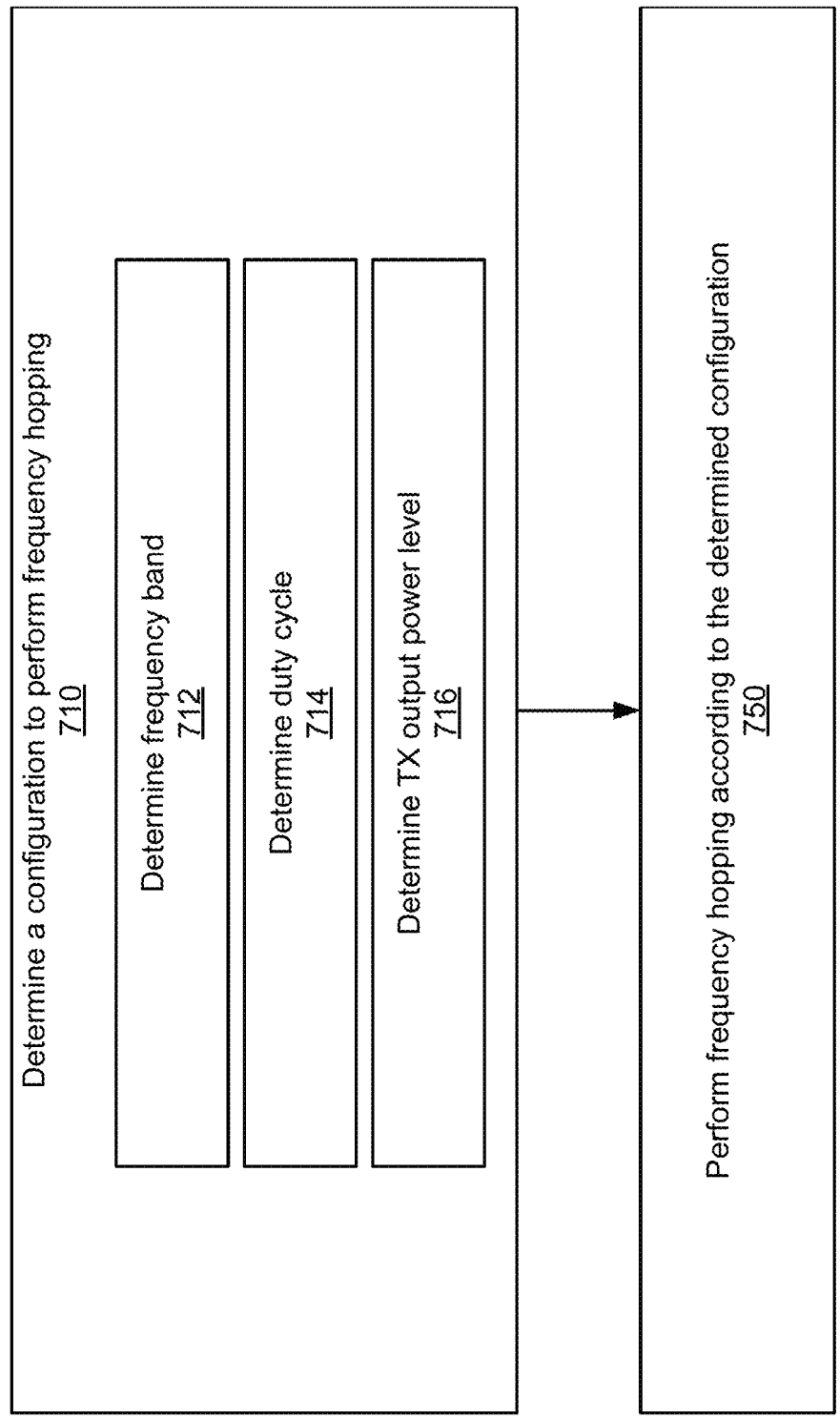
FIG. 7 is a diagram of an example flow chart showing a process of performing a narrowband communication, according to an example implementation of the present disclosure.

FIG. 7 is a diagram of an example flow chart showing a process 700 of performing a narrowband communication, according to an example implementation of the present disclosure. In some embodiments, the process 700 is performed by a NB device 350. In some embodiments, the process 700 is performed by other devices. In some embodiments, the process 700 includes more, fewer, or different steps than shown in FIG. 7.

In one approach, the NB device 350 determines 710 a configuration to perform frequency hopping for communication over NB communication protocol. The NB device 350 may determine the configuration to perform for the communication over NB commutation protocol by obtaining preset configuration information stored by memory 368, by receiving an instruction or commands from other devices (e.g., HWD 150, console 110 or any Wi-Fi communication device), or by monitoring the channel condition of Wi-Fi communication.

In one aspect, the NB device 350 may determine 712 one or more frequency bands to perform frequency hopping for NB communication. For example, the one or more frequency bands to perform the frequency hopping for NB communication can be one or more upper contiguous frequency bands. For example, the one or more frequency bands to perform the frequency hopping for NB communication can be one or more lower or intermediately-situated contiguous frequency bands. For example, the one or more frequency bands may be one or more gaps between channels of Wi-Fi communication. In one approach, the NB device 350 may monitor, determine, or detect a number of channels of Wi-Fi communication, and determine one or more frequency bands to perform frequency hopping for NB communication, according to the number of channels of Wi-Fi communication. For example, as more number of channels of Wi-Fi communication are available, more number of frequency bands may be assigned to or allocated for the NB device 350. One or more determined frequency bands may be assigned or allocated to a set of channels for NB communication.

In one aspect, the NB device 350 may determine 714 a duty cycle to perform frequency hopping for NB communication. In one example, a duty cycle of 100% can be allowed for NB communication, if the target TX power or target PSD is less than 10 dBm/MHz or some other defined threshold. When the target TX power or target PSD reaches 10 dBm/MHz, the duty cycle may be reduced to 25%, and may decrease further as the target TX power increases.

In one aspect, the NB device 350 may determine 716 a TX power or PSD to perform frequency hopping for NB communication. For example, as the target number of frequency hops increases, the TX power or PSD of NB communication may linearly increase, until the TX power or PSD reaches a threshold value (e.g., 10 dBm/MHz). For example, the PSD may be set to be less than 10 dBm/MHz and the TX power may be less than 14 dBm.

In one approach, the NB device 350 may perform 750 frequency hopping according to the determined configuration. For example, the processor 364 may cause or configure the communication interface 362 to perform NB communication, according to the determined TX power/PSD, frequency bands, duty cycle, etc. Advantageously, by controlling or limiting the TX power, frequency bands and/or duty cycle as disclosed herein, the interference due to the NB device 350 communicating over the NB communication protocol can be reduced to protect the communication for the latency sensitive data over Wi-Fi communication protocol.

Figure 8:
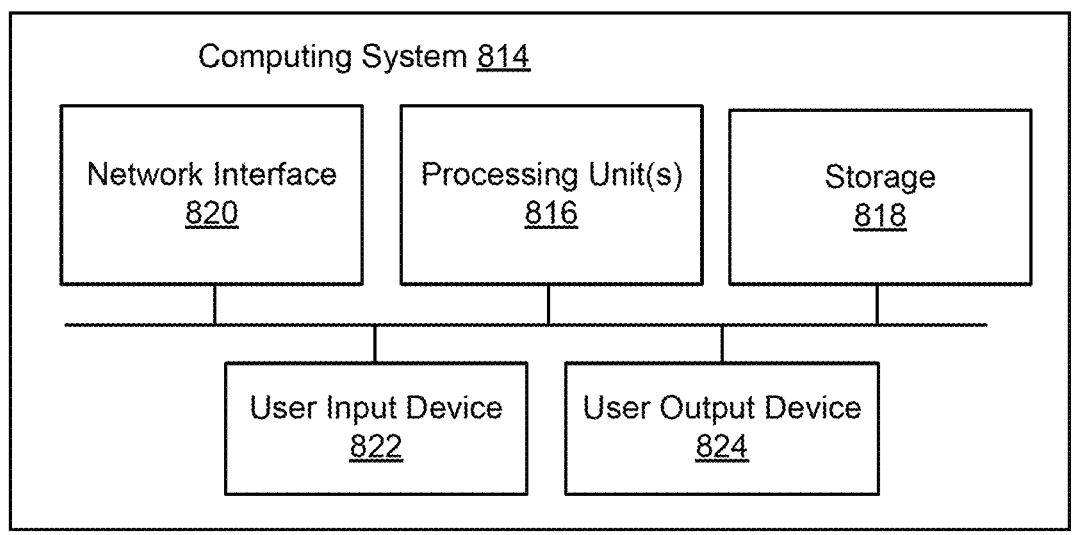
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some embodiments, the console 110 or the HWD 150 of FIG. 1, or the NB device 350 of FIG. 3 are implemented by the computing system 314. Computing system 814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It will be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a wireless device, at least one frequency band within which to perform frequency hopping, the at least one frequency band comprising at least one of: an upper contiguous portion within a predetermined frequency range, or a plurality of frequency bands spaced apart from each other at a defined interval and each having a defined bandwidth, the defined interval being a channel bandwidth of communication through a first protocol and each frequency bandwidth of the plurality of frequency bands being a channel bandwidth of communication through a second protocol; and
   performing, by the wireless device, frequency hopping within the at least one frequency band.

2. The method of claim 1, wherein a transmission output power of the frequency hopping by the wireless device is less than or equal to 10 dBm/MHz.

3. The method of claim 1, wherein each frequency band of the plurality of frequency bands is smaller than the defined interval.

4. The method of claim 1,
   wherein the first protocol is a Wi-Fi communication protocol, and
   wherein the second protocol is a Bluetooth communication protocol.

5. The method of claim 1, wherein the at least one frequency band is defined according to the channel bandwidth of the communication through the first protocol.

6. The method of claim 1, further comprising:
   determining, by the wireless device, a number of available channels of the communication through the first protocol; and
   determining, by the wireless device, the at least one frequency band, according to the number of available channels.

7. The method of claim 1, further comprising:
   setting, by the wireless device, a duty cycle of a transmission for the frequency hopping, according to a channel bandwidth of the first protocol.

8. The method of claim 7, wherein the duty cycle of the transmission for the frequency hopping is proportional to the channel bandwidth of the first protocol.

9. The method of claim 1, further comprising:
   setting, by the wireless device, channel occupancy time (COT) to be equal to or less than a dwell time.

10. The method of claim 9, wherein COT is a time period for the wireless device to evaluate a channel for the frequency hopping, and the dwell time is a time period that the wireless device can stay in the same channel for frequency hopping.

11. The method of claim 1, further comprising:
    setting, by the wireless device, an allowable transmission power for the frequency hopping, according to a bandwidth of the at least one frequency band.

12. A wireless device comprising:
    a wireless interface; and
    one or more processors configured to:
       determine at least one frequency band within which to perform frequency hopping, the at least one frequency band comprising at least one of: an upper contiguous portion within a predetermined frequency range, or a plurality of frequency bands spaced apart from each other at a defined interval and each having a defined bandwidth, the defined interval being a channel bandwidth of communication through a first protocol and each frequency bandwidth of the plurality of frequency bands being a channel bandwidth of communication through a second protocol; and cause the wireless interface to perform frequency hopping within the at least one frequency band.

13. The wireless device of claim 12, wherein a transmission output power of the frequency hopping by the wireless device is less than or equal to 10 dBm/MHz.

14. The wireless device of claim 12, wherein each frequency band of the plurality of frequency bands is smaller than the defined interval.

15. The wireless device of claim 12,
wherein the first protocol is a Wi-Fi communication protocol, and
wherein the second protocol is a Bluetooth communication protocol.

16. The wireless device of claim 12, wherein the at least one frequency band is defined according to the channel bandwidth of the communication through the first protocol.

17. The wireless device of claim 12, wherein the one or more processors are further configured to:
determine a number of available channels of the communication through the first protocol; and
determine the at least one frequency band, according to the number of available channels.

18. The wireless device of claim 12, wherein the one or more processors are further configured to:
set channel occupancy time (COT) to be equal to or less than a dwell time.

\* \* \* \* \*